(12) United States Patent
Slocik et al.

(10) Patent No.: US 7,905,943 B1
(45) Date of Patent: Mar. 15, 2011

(54) SYNTHESIS OF HYBRID INORGANIC NANOPARTICLE STRUCTURES USING PEPTIDES

(75) Inventors: Joseph M. Slocik, Dayton, OH (US); Rajesh R. Naik, Dayton, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 603 days.

(21) Appl. No.: 12/008,537

(22) Filed: Jan. 8, 2008

(51) Int. Cl.
*B22F 9/24* (2006.01)
(52) U.S. Cl. .......................................... 75/351; 977/705
(58) Field of Classification Search .................... 75/343, 75/351, 362, 370; 977/701, 702, 705, 707, 977/715, 719, 773, 774, 775, 777, 778, 783; 506/9; 530/300–345
See application file for complete search history.

(56) References Cited

OTHER PUBLICATIONS

J-S Jan et al. Biomimetic synthesis of inorganic nanospheres, Chem Mater, vol. 17, (2005), pp. 4310-4317, published online: Jul. 19, 2005.*

* cited by examiner

*Primary Examiner* — George Wyszomierski
*Assistant Examiner* — Mark L Shevin
(74) *Attorney, Agent, or Firm* — AFMCLO/JAZ; Bart Hersko

(57) ABSTRACT

Bimetallic hybrid nanostructures exhibit enhanced properties beyond a single composition nanoparticle, but present technical challenges for synthesis that includes the ability to process two or more materials while offering control over structural arrangement. Unlike conventional synthetic strategies, biological systems are excellent manufacturers of complex inorganic materials which possess maximal functionality, quality, and structures. Using a bio-mediated approach, Applicants have developed a synthetic method for the controlled synthesis of bimetallic nanostructures using multifunctional peptides.

5 Claims, 1 Drawing Sheet

SYNTHESIS OF HYBRID INORGANIC NANOPARTICLE STRUCTURES USING PEPTIDES

RIGHTS OF THE GOVERNMENT

The invention described herein may be manufactured and used by or for the Government of the United States for all governmental purposes without the payment of any royalty.

BACKGROUND OF THE INVENTION

The invention relates to the synthesis of inorganic hybrid nanoparticle structures using peptides which consist of two or more inorganic materials.

Bimetallic nanoparticles exhibit enhanced properties relative to single composition metal nanoparticles such as improvements in catalytic activity, changes in the plasmon energy band, and expected electronic gains. These properties are dependent upon nanoparticle size, structural organization, and composition of the bimetallic material. Therefore, approaches to their synthesis have involved the use of dendrimer hosts, reverse micelles, polyol processes, and microemulsions. For example, PdPt nanoparticles have been prepared within hydroxyl containing dendrimers by the addition of stoichiometric amounts of $Pd^{4+}$ and $Pt^{2+}$; while Au—Pd and Au—Pt bimetallic particles were synthesized with reverse micelles and polyvinylpyrrolidone, respectively. Unfortunately, these approaches offer little control with regard to the structural arrangement of each metallic component; and as a result, translate into poorly defined structures. Fundamentally, this is due to a lack of template specificity in arranging multiple metals in a fixed spatial orientation, i.e., templates containing single functionalities (OH or $NH_2$) which bind many different metals (Pd, Ag, Au, Pt). For instance, hydroxyl containing dendrimers contain one functional group and a relatively large confined reaction space for synthesis, but are extended for the synthesis of two different metals with similar affinities in this confined area. Consequently, there is no discretion as to how metals are organized with respect to another to form the bimetallic material which ultimately affects the final physical properties of the hybrid material to the extent of not being fully exploited.

Alternatively, peptides designed with multi-functionality expand nanoparticle synthesis beyond single composition metal nanoparticles making it possible to controllably synthesize mixed compositions of inorganic nanoparticles in defined structures as outlined below.

SUMMARY OF THE INVENTION

The invention described herein involves the use of a single peptide template for the synthesis and assembly of two or more different inorganic nanoparticles as an integrated hybrid nanoparticle structure with defined spatial organization, composition, structure, and geometry. Briefly, a peptide coated metal nanoparticle is synthesized from a selected peptide sequence and the appropriate metal salt precursor. The particle is purified to remove excess peptide and then used as a template for the synthesis of a second inorganic nanoparticle. This is prepared by adding a second metal ion precursor that selectively binds to the exposed groups of the peptide surface of the first nanoparticle. The bound metal ions are subsequently reduced with reductant to form zero-valent metal nanoparticles at the peptide interface resulting in the dual composition nanoparticle material.

The components of the hybrid nanostructure include any combination of metals, metal ions, semiconductor quantum dots, nanoparticles, magnetic materials, and negative index materials.

The geometry of the inorganic materials includes any combination of spheroidal particles, rods, cubes, tetrahedrons, multiple faceted particles, and planar surfaces.

Importantly, the resulting hybrid particles exhibit enhanced properties relative to their single nanoparticle counterpart as a result of their controlled structural assembly which includes gains in electrical properties, catalytic activity, and optical properties.

DETAILED DESCRIPTION

Figure 1:
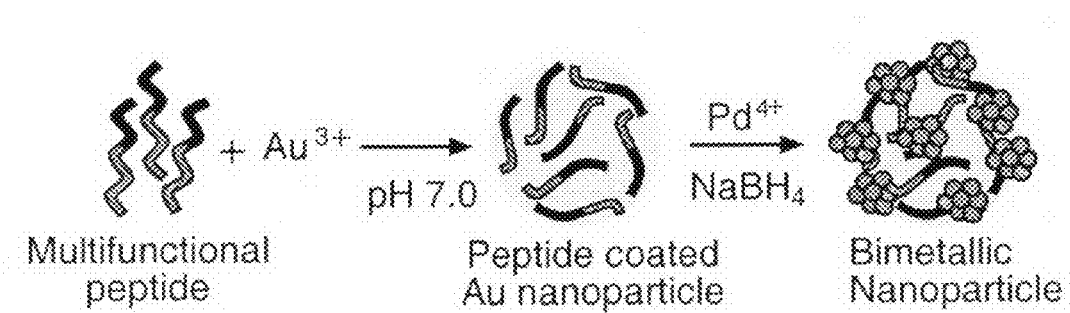
FIG. 1 is a schematic illustration of the synthesis of Au—Pd bimetallic nanoparticles using a multifunctional peptide sequence, $Au^{3+}$ and $Pd^{4+}$ precursors, and reductant.

Applicants have developed a peptide mediated approach for the synthesis of bimetallic nanoparticle structures from two or more inorganic materials. FIG. 1 is a schematic illustration of Applicants process for the synthesis of Au—Pd nanoparticles using peptides.

A multifunctional peptide sequence is designed to contain multiple domains selective for metal ion binding, NP nucleation, synthesis, and stabilization. For example, the FlgA3 peptide (DYKDDDDKPAYSSGAPPMPPF) contains two domains, a domain for stabilizing palladium nanoparticles (Flg) and a domain for synthesizing gold (A3), respectively.

Given the high metal specificity and established use as a nanoparticle template; a peptide coated metal nanoparticle (gold) is synthesized from appropriate metal ion precursor ($HAuCl_4$) and peptide (FlgA3). In this case, the peptide also acts as the reductant. The peptide coated particles are then purified from excess unbound peptide.

$Pd^{4+}$ ions are added to the peptide coated gold nanoparticle and incubated to promote binding of metal ions to the peptide interface of the gold nanoparticle. The bound metal ions are then reduced at the peptide nanoparticle surface to form zero-valent metal particles of palladium which decorate the surface of the gold nanoparticle as shown in FIG. 1.

EXAMPLE 1

Physical Characterization of Au—Pd Structures

Figure 2:
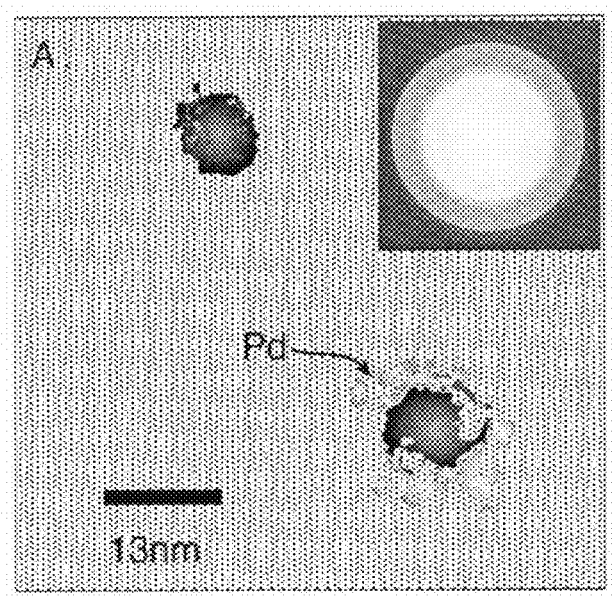
FIG. 2 is a TEM image showing structure of Au—Pd nanoparticles.

Au-(FlgA3)-Pd structures were examined by transmission electron microscopy, electron diffraction, UV-Vis spectroscopy, and sedimentation using CPS particle size analysis techniques. TEM images showed a peptide coated gold particle of 10.7 nm in diameter decorated by 5-25 palladium nanoparticles anchored at the gold surface via peptide surface as illustrated in FIG. 2. Palladium particles appear uniformly distributed around gold nanoparticle and are evenly spaced apart. Energy dispersive X-ray spectroscopy confirmed the hybrid structure as being composed of 24.4 wt % Pd and 75.6 wt % Au. UV-Vis spectroscopy of the resulting Au-(FlgA3)-Pd solution showed a decreased Plasmon resonance of gold ca. 522 nm and an increase in the absorption edge at longer wavelengths. Additionally, the Au—Pd structure was confirmed by sedimentation on a sucrose gradient, where nanoparticle size increased from 10.7 nm for a single Au-(FlgA3) nanoparticle to 15.5 nm for Au-(FlgA3)-Pd.

EXAMPLE 2

Enhancement of Catalytic Activity

Au-(FlgA3)-Pd was tested for catalytic activity in the hydrogenation of unsaturated alcohols, specifically 3-buten-1-ol. As a result, hydrogenation of substrate with Au—Pd occurred at a turnover frequency of 1016 mol $H_2$/mol Pd.Hr and 96.1% conversion. By comparison, catalytic activity of Au-(FlgA3)-Pd is higher than bare palladium nanoparticles, palladium passivated with FlgA3 peptide, or Au-(A3Flg)-Pd with a modified peptide (Table 1).

TABLE 1

| Hydrogenation activity of nanoparticles | | |
|---|---|---|
| Nanoparticle catalyst | % Conversion [a] | TOF [b] |
| Pd nanoparticles | 92.5 | 501 |
| Pd passivated with FlgA3 peptide | 0 | 0 |
| Au-(FlgA3)-Pd | 96.1 | 1016 |
| Au-(A3Flg)-Pd | 54.3 | 96 |

What is claimed is:

1. A method for synthesizing gold-palladium bimetallic nanostructures in a controllable manner using a multi-functional peptide template, said method comprising the steps of:
   a) providing a multi-functional FlgA3 peptide template containing two domains, a first domain for binding gold nanoparticles and a second domain for binding palladium nanoparticles;
   b) adding gold ions to the FlgA3 peptide template to form a gold coated peptide nanoparticle; and
   c) adding palladium ions to the gold coated peptide nanoparticle to form the gold-palladium bimetallic nanostructures.

2. The method according to claim 1 where the FlgA3 peptide template acts as a reductant in the synthesis of the gold-palladium bimetallic nanostructures.

3. The method according to claim 1 where the FlgA3 peptide template controls the construction of the gold-palladium bimetallic nanostructures with regard to spatial and temporal arrangement, geometry, and size.

4. The method according to claim 1 wherein the gold ions are $Au^{3+}$.

5. The method according to claim 4 wherein the palladium ions are $Pd^{4+}$.

* * * * *